Patented July 15, 1924.

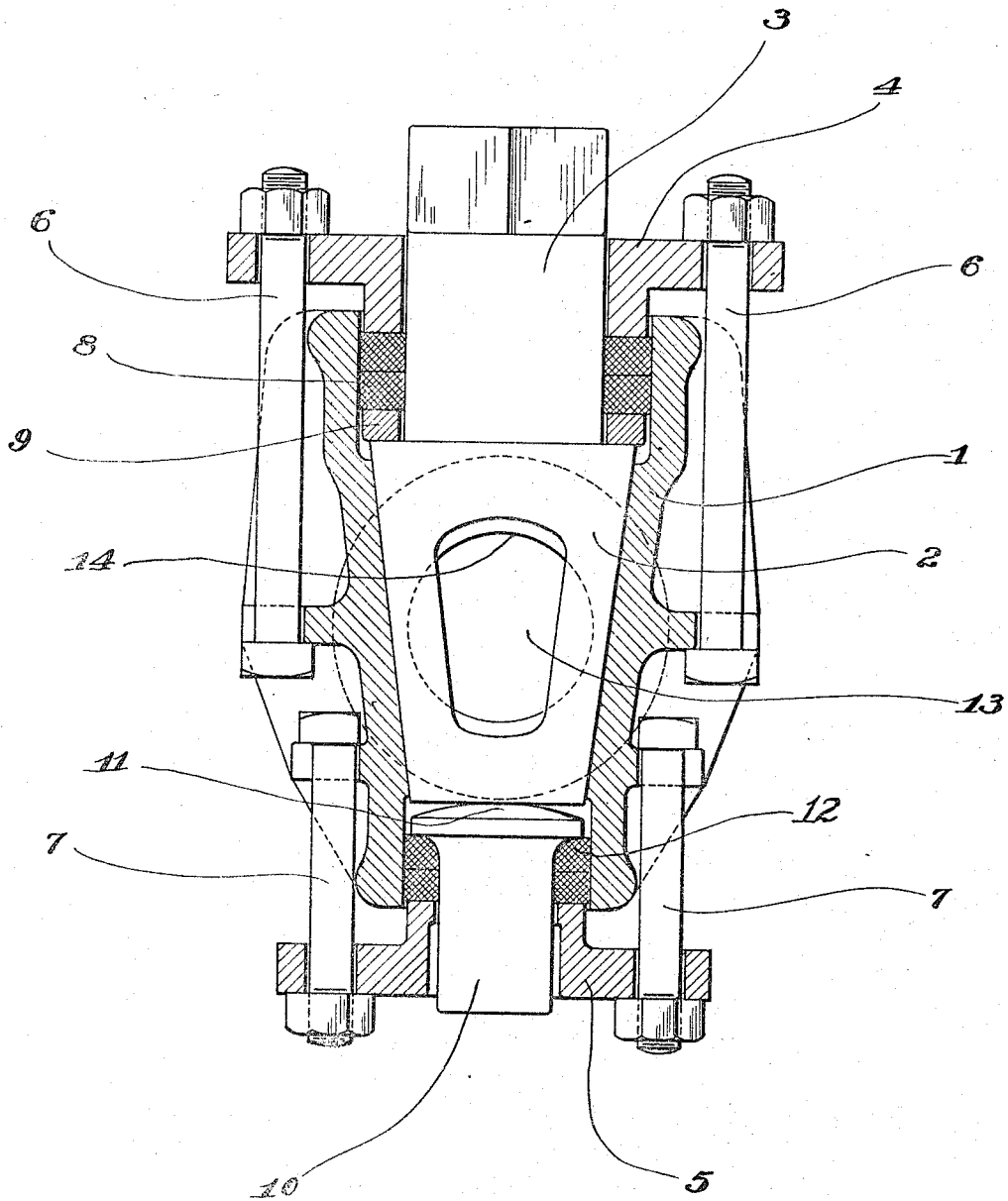

1,501,347

UNITED STATES PATENT OFFICE.

OYSTEIN JACOBSEN, OF DAYTON, OHIO, ASSIGNOR TO THE DURIRON COMPANY, INC., A CORPORATION OF NEW YORK.

VALVE.

Application filed November 12, 1923. Serial No. 674,194.

*To all whom it may concern:*

Be it known that I, OYSTEIN JACOBSEN, a citizen of the United States, and a resident of Dayton, in the county of Montgomery and State of Ohio, have made a new and useful invention in Improvements in Valves, of which the following is a specification.

The invention relates to what are known as plug valves or cocks. It has for its principal objects, the provision of a valve construction, (1) having improved means for loosening the plug in case it becomes stuck, (2) arranged so that the pressure applied to the packing around the plug stem, tending to seat the plug tightly in its conical seat, is partially counterbalanced so that the packing can be made very tight without rendering the plug difficult to seat, and (3) having a loosening device which applies a minimum amount of friction to resist the turning of the plug. One embodiment of the invention is illustrated in the accompanying drawing wherein:

The figure is a vertical section through a valve embodying the improved construction.

Referring to the drawing, 1 is the valve casing open at both ends and having a tapering seat, in which is mounted a plug 2 provided with a stem 3, the upper end of which is square in cross section and adapted to receive the usual handle.

Followers or glands 4 and 5 are provided at the opposite ends of the casing, such followers being flanged, and secured by means of the pairs of bolts 6, 6 and 7, 7. In the space surrounding the stem 3 are suitable packing rings 8, and between the packing and the outer shoulder of the plug is a metal ring 9. The pressure of the follower on the packing tends to force the plug tightly into its conical seat.

Bearing against the inner end of the plug is a piston or plunger, consisting of the head 11 and the stem 10. In the space surrounding the stem of the plunger are packing rings 12 which bear against the head of the plunger, and are pressed inward by the follower 5. 13 is the opening through the plug and 14 the inlet opening to the casing, the plug being shown in open position.

The followers 4 and 5 may both be forced in tightly to prevent any danger of leakage without rendering the plug difficult to turn, as the pressures from the two ends of the plug counterbalance each other and the seating pressure of the plug is prevented from becoming excessive. Furthermore, the frictional resistance between the head of the plunger and the end of the plug is reduced by making one of the engaging surfaces convex, preferably the head, as illustrated, although this may be reversed. The application of the pressure on a limited area along the axis of the plug, instead of over a large area, is also advantageous, as the plug seats more evenly under these conditions, and there is no opportunity for the point at which pressure is applied by the plunger to shift, as is the case if a plunger is used having a flat bearing surface, if such surface is not exactly true or if the plunger is for any reason tilted slightly so that its axis does not coincide with that of the plug.

In case the plug becomes stuck in its seat so that it cannot be turned, it may be readily loosened by tightening the bolts 7, 7 and thus forcing the plunger inward, the loosening effect being further facilitated by loosening the bolts 6, 6.

It will be apparent that the construction is simple and effective, and that it can be made at a minimum cost. Also that the loosening is accomplished in a positive manner, and that the valve may be made very secure against leakage without making the plug unduly difficult to turn in its seat. Other advantages incident to the construction will be readily apparent to those skilled in the art.

What I claim is:

1. In combination in a plug cock, a casing open at both ends and having a tapering seat, a tapering plug provided with a stem projecting from the casing with a packing space between the casing and stem, packing in said space, a follower engaging the packing and applying pressure to seat the plug, a plunger comprising a head opposing the inner end of the valve and a stem projecting from the casing with a packing space between the stem and casing, packing in said space, a follower engaging the packing and applying pressure to said head and causing it to apply pressure to the inner end of the plug, and screw means for forcing the plunger inward.

2. In combination in a plug cock, a casing open at both ends and having a tapering seat, a tapering plug provided with a stem projecting from the casing with a packing space between the casing and stem, packing in said space, a follower engaging the packing and applying pressure to seat the plug, a plunger comprising a head opposing the inner end of the valve and a stem projecting from the casing with a packing space between the stem and casing, packing in said space, a follower engaging the packing and applying pressure to said head and causing it to apply pressure to the inner end of the plug, and screw means for forcing the plunger inward, the opposing surfaces at the inner end of the plug and the plunger head contacting only at the center of the plug.

3. In combination in a plug cock, a casing open at both ends and having a tapering seat, a tapering plug provided with a stem projecting from the casing with a packing space between the casing and stem, packing in said space, a follower engaging the packing and applying pressure to seat the plug, a plunger comprising a head opposing the inner end of the valve and a stem projecting from the casing with a packing space between the stem and casing, packing in said space, a follower engaging the packing and applying pressure to said head and causing it to apply pressure to the inner end of the plug, and screw means for forcing the plunger inward, one of the opposing surfaces at the inner end of the plug and the plunger head being convex to reduce the area of contact.

In testimony whereof, I have hereunto subscribed my name this 8th day of November, 1923.

O. JACOBSEN.